United States Patent [19]

Woodward et al.

[11] 4,045,980
[45] Sept. 6, 1977

[54] RETAINER FOR SLIP SLEEVE LINERS

[75] Inventors: Thomas D. Woodward, Munster, Ind.; Gail G. Worsley, Hazelcrest, Ill.

[73] Assignee: Rexnord Inc., Milwaukee, Wis.

[21] Appl. No.: 702,825

[22] Filed: July 6, 1976

[51] Int. Cl.² ............................................. F16D 3/06
[52] U.S. Cl. ...................................... 64/23; 64/1 S; 64/4; 403/317; 403/356
[58] Field of Search ................. 64/23 R, 9, 4, 27 NM, 64/11 R, 1 V, 1 R; 403/316, 317, 318, 319, 356

[56] References Cited
U.S. PATENT DOCUMENTS

| | | | |
|---|---|---|---|
| 3,066,503 | 12/1962 | Fleming et al. | 64/23 |
| 3,073,135 | 1/1963 | Wood | 64/23 |
| 3,105,370 | 10/1963 | Weasler | 64/23 |
| 3,475,043 | 10/1969 | Anderson | 403/317 |
| 3,663,046 | 5/1972 | Reiner et al. | 64/23 |

Primary Examiner—Samuel Scott
Assistant Examiner—Randall Heald

[57] ABSTRACT

A telescopic drive line includes an inner square drive shaft and an outer drive tube having a square bore at one end. A thin-walled liner in the bore has an inner surface providing a low-friction axial bearing for the drive shaft. The considerably greater coefficient of friction between the outer body of the liner and the bore of the drive tube secures the liner axially in the bore irrespective of the radial force applied to the liner. Only supplementary securement is provided by a key fitted in a keyway. The several liners fit between inward projections of the key. An outward projection fitting a recess in the drive tube secures the key axially. Deflection of the exposed end of the key allows the projecting tab to be disengaged from the recess for insertion and withdrawal of the key along with the several sleeves.

8 Claims, 8 Drawing Figures

U.S. Patent Sept. 6, 1977 Sheet 1 of 2 4,045,980
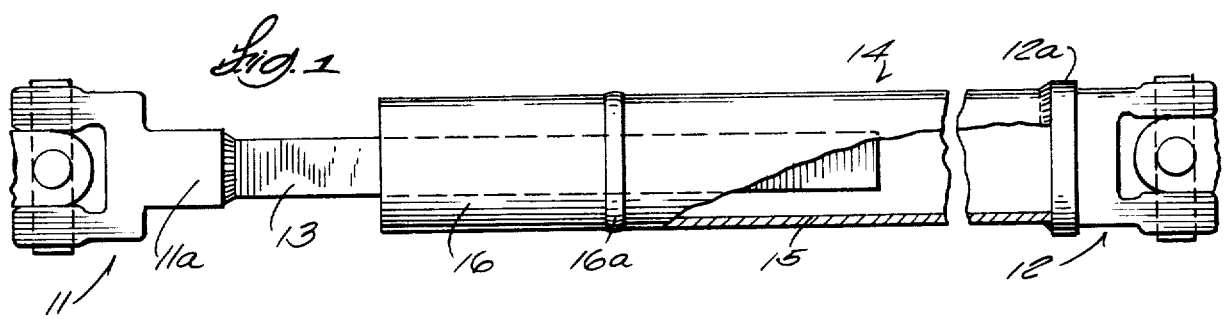
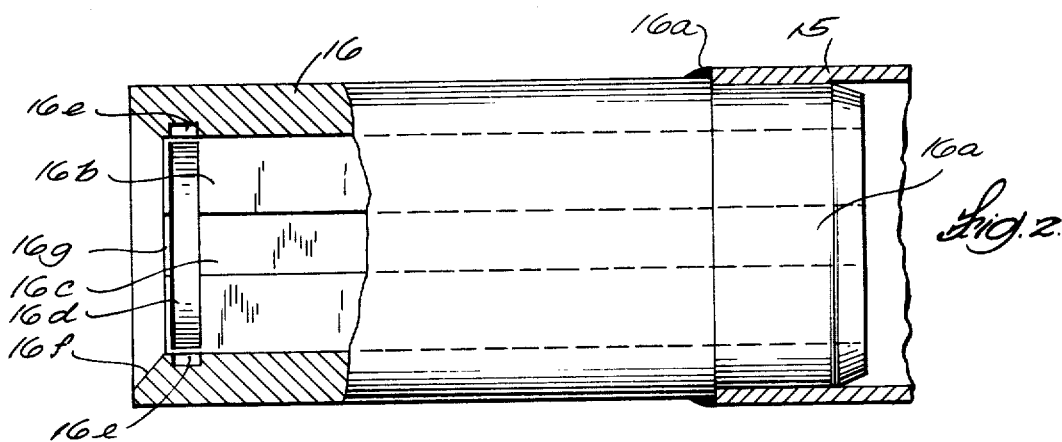
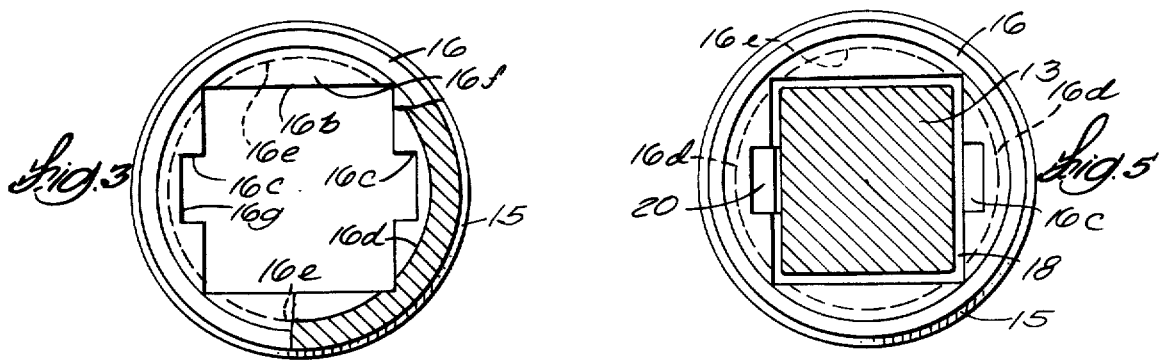
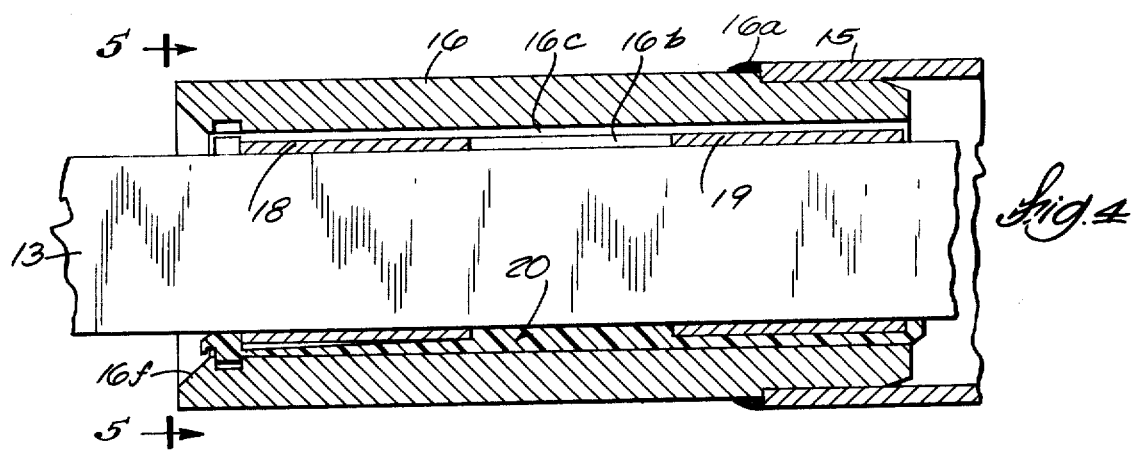

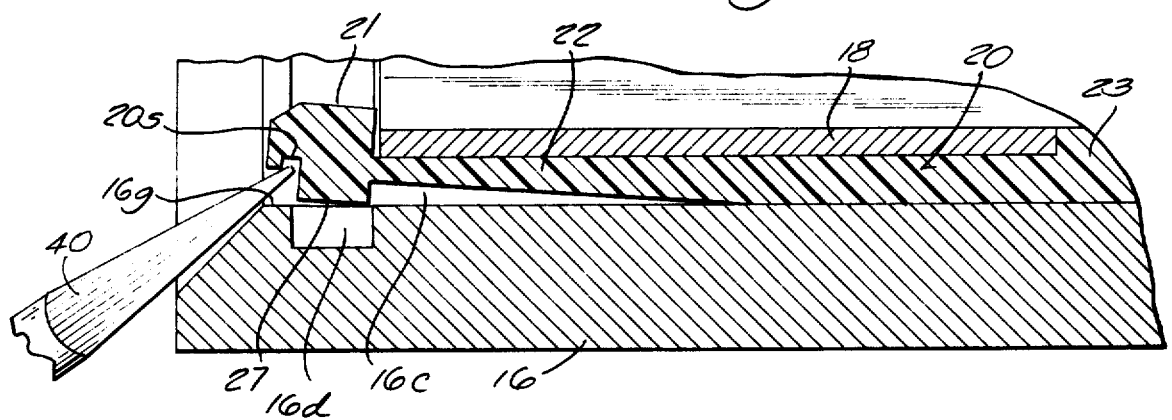
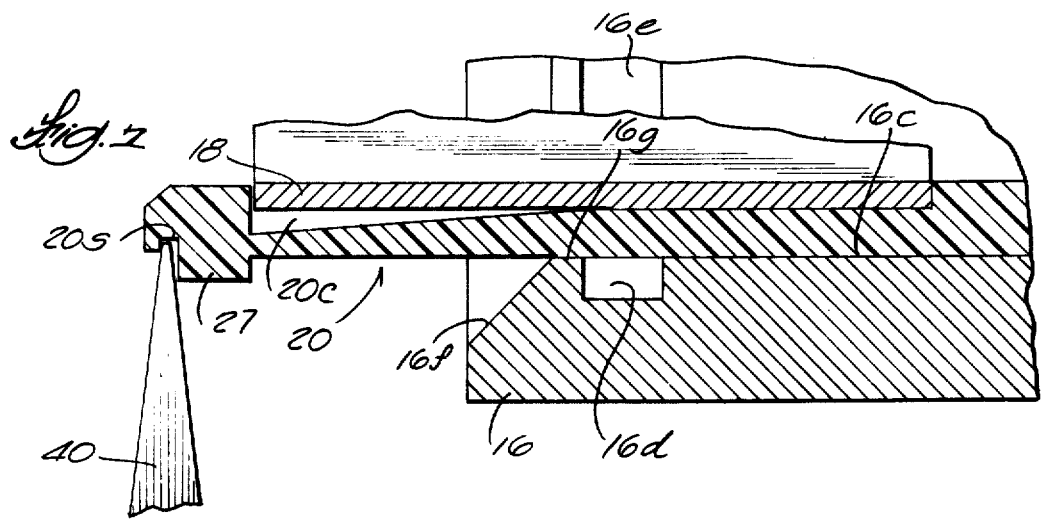
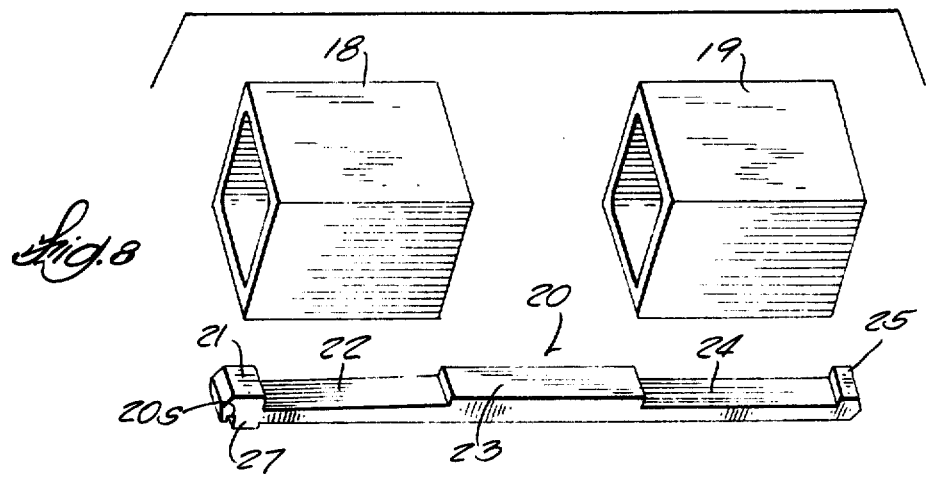

RETAINER FOR SLIP SLEEVE LINERS

BACKGROUND OF THE INVENTION

The axial bearings of a telescoping drive line such as for agricultural implements have generally been of the lubricated type. Anti-friction bearings have been used in drive lines for agricultural implements but have generally been found to be unduly expensive and requiring too frequent maintenance. A recently developed glass filament reinforced resin-bodied thin-walled liner having a Teflon fabric inner face has been found to provide the low break-away force required of telescopic drive lines and to withstand the pulsating loads applied thereto. The unique capability of the particular liners referred to in essentially providing their own securement within the bore of the outer drive tube is the subject of the co-pending application Ser. No. 593,132 filed July 3, 1975 by Fritz A. Callies for TELESCOPING DRIVE LINE, now Pat. No. 4,020,659 .The telescoping drive line of said application includes a readily replacable liner requiring at most nominal endwise securement for assembly purposes. It is an object of the present invention to provide a simple, rugged, inexpensive retainer which may be readily inserted along with the liners in their assembly. It may also be desireable to be able to remove damaged or worn liners readily in the field under such adverse circumstances as may there by encountered and with no more than a simple tool such as a screwdriver or possibly a pocket-knife.

SUMMARY OF THE INVENTION

The outer drive tube of a telescopic drive line is provided with a square bore and a keyway parallel to the bore and centrally of one of the flat sides of the bore. A recess at the exposed end of the keyway receives the outwardly extending projection of a key. Portions of the key project into the bore and engage the opposite ends of a single liner or several liners to secure them axially in the bore. When the projection is retracted, the key is slidably disposed in the keyway so that the liner or liners are also slidable in the bore. For that purpose, the key is of a resilient or plastic material and the radial dimension of the key diminishes toward the outer end of the key so that the outer end may be deflected radially inwardly to retract the projection and allow the key to be slidably positioned in the keyway or withdrawn therefrom. The square shaft when slidably supported in the liner or liners prevents the projection from leaving the recess under any circumstances.

If the liners, when worn and requiring replacement, have become tight in the bore, the liners may have to be destructively removed; the similar removal of the key may then be convenient or also required. In any case, the key is of nominal cost and the invention optimally includes the provision and use of a new key with the replacement liners.

BRIEF DESCRIPTION OF THE SEVERAL VIEWS OF THE DRAWINGS

FIG. 1 shows a typical drive line with a universal joint at each end. The parts of the universal joints which are connected to the drive line are drive shafts of the machines (not shown) are broken away and sectioned.

FIG. 2 is an enlarged view of the end of the outer drive tube which includes a machined sleeve provided with a square bore. Parts of the drive tube are broken away and sectioned.

FIG. 3 is an end view of the outer drive tube shown in FIG. 2 and is partially broken away and sectioned to expose two of the recesses at the end thereof.

FIG. 4 is a view of the drive tube as shown in FIG. 2, except that it has been rotated 90°; the Figure includes the liners in section; the inner drive shaft is slideable in the liners; the key is shown positioning the liners.

FIG. 5 is a section taken on line 5—5 of FIG. 4 and shows the end of the outer tube is in elevation.

FIG. 6 shows the insertion of a screwdriver in the initial step of removing the liners of the drive tube sleeve and the key.

FIG. 7 is a view similar to FIG. 6 and shows a liner and key partially removed from the drive tube sleeve.

FIG. 8 is a perspective view of two sleeve liners and the key of the present invention.

DESCRIPTION OF THE PREFERRED EMBODIMENT

The telescoping drive line shown in the drawing includes the universal joint 11 and 12, the square inner shaft 13 and the tubular outer shaft 14. Shaft 13 is of solid steel construction and should have corrosion-resistant, smooth sliding surfaces. One end of shaft 13 is welded to the hub 11a of universal joint 11. Shaft 13 is not exactly square for what is called phasing purposes, as will be described.

The outer shaft 14 comprises the seamed or seamless tube 15, the sleeve 16 and the liner assembly which will be described. Sleeve 16 is of solid steel round stock and end 16a of sleeve 16 is welded to one end of the tube 15; the other end of tube 15 is welded to the hub 12a of universal joint 12.

The liner assembly consists of the two identical liners 18 and 19 and the retainer or key 20.

The square bore 16b of sleeve 16 extends the length thereof and is of a size which allows liners 18 and 19 to be inserted endwise with a slip-fit or a slide fit. Each liner is in the form of a square tube having a wall thickness of about 4mm and is typically 38mm long. Their length is important to providing adequate bearing areas for shaft 13 and their over-all spacing or length is also important in supporting the drive line.

For phasing purposes, liners 18 and 19 can be inserted endwise in bore 16b as shown or in a position turned 180° about their axis; shaft 13 can similarly be inserted in the liners as shown or when turned 180°. These limitations are due to the fact that the sections of shaft 13, the liners 18 and 19 and bore 16b are nearly square but actually rectangular. Accordingly shafts 13 and 14 can be assembled in either of only two different rotational positions which are 180° apart so that the phase relationship of universal joints 11 and 12 is maintained.

Each liner 18 and 19 is of a composite construction and the liners are preferably identical. Each liner has, of course, adequate compressive strength and impact resistance; the inner facing of each liner has good wear resistance and self-lubricating properties, a low coefficient of friction and a low breakaway force. In the presently preferred embodiment of the invention, the body of liners 18 and 19 are of a glass filament reinforced resin and their inner facing is of Teflon woven fabric which is embedded in the resin of the body. The coefficient of friction of the outer surface of each liner with the steel sleeve 16 is in the order of 0.3 whereas the coefficient of friction of the inner surface of each liner with the steel square inner shaft 13 is less than 0.1. The latter coefficient of friction is, of course, in the order of that which is required so that typically, a 1500 pounds of axial thrust is not exceeded at the maximum torque loads for which this limit is applicable.

Accordingly, the relative coefficients of friction are of such an order that only normal securement of the liners 18 and 19 in bore 16b of sleeve 16 is required. The present invention provides such securement by means of the key 20 which may be fitted in either of grooves 16c formed in sleeves 16. Grooves 16c are oppositely disposed and adjoin the bore 16b. The portions of liners 18 and 19 which span the grooves are unsupported but are mid-way between the load-bearing portions of the liners which adjoin their corners. Two grooves 16c are provided mainly for a balance in the broaching operation by which the grooves are formed; they also allow the use of two keys 20 if desired. However, a single key has been found to provide the entirely adequate securement of the liners.

The key 20 of the present invention consists of a single molded device of uniform width and is of a size so that it has a sliding fit in either groove 16c and extends generally the length thereof. Nylon is a suitable material for key 20. The radial dimensions of key 20 (having reference to the axis of sleeve 16) are such that it is convenient to describe the key as having five sections 20–25 of different configurations and functions.

The outer and inner connecting sections 22 and 24 fit entirely within groove 16c and respectively extend alongside liners 18 and 19. The locking end 21, the intermediate section 23 and the inner end 25 extend to but do not contact the shaft 13. Section 23 thus extends between liners 18 and 19 and spaces them; the inner end 25 forms an abutment which limits the relative inward axial movement of liner 19. That is, liner 19 fits between section 23 and end 25; liner 18 similarly fits between the spacing section 23 and the locking end 21.

In order that key 20 may function to position liners 18 and 19 axially in bore 16b of sleeve 16, key 20 must itself be positioned axially in groove 16c by means which also allows its removal when desired. For that purpose, sleeve 16 is internally machined to provide an annular slot having a bottom radius preferably less than the distance from the sleeve center to the corners of bore 16b. Such machining in effect provides opposite slots 16d which respectively intersect grooves 16c and two intermediate slots 16e. Slots 16e have no function other than to allow machining slots 16d in a simple single lathe operation of low cost. In the same operation the end 16f of sleeve 16 may also be chamfered as shown to provide a lead-in for shaft 13.

Each slot 16d forms a recess at the outer end of groove 16c and end 21 of key 20 includes a projection 27 which extends into the recess. While projection 27 normally prevents endwise movement of key 20 in groove 16c, the endwise insertion and removal of key 20 from either groove 16c requires that the projection 27 be permitted to pass over or by that portion of sleeve 16 which forms the ledge 16g between slot 16d and the open end of sleeve 16. The means therefor and by which key 20 may be so engaged and disengaged depends merely on two dimensional features of key 20; one is that the radial dimension of connecting section 22 of key 20 is tapered or diminishes toward locking end 21 so that a clearance 20c is normally provided between liner 18 and section 22; the other feature is that locking end 21 of key 20 is provided with an exposed cross-wise slot 20s.

It is important to note that the assembly and disassembly of liners 18 and 19 in and from sleeve 16 with key 20 can only be accomplished with shaft 13 removed from shaft 14. For assembly, key 20 is disposed with its section 24 laid against one side of liner 19 so that they may be inserted together, respectively in bore 16b and either groove 16c. While section 23 is still partially extending from sleeve 16, liner 18 is similarly placed against section 22 and key 20 and liners 18 and 19 are further inserted into sleeve 16.

When projection 27 reaches ledge 16g, the section 21 of key 20 is pushed toward the sleeve axis, this motion being allowed by the clearance 20c provided. That is, key 20 is deflected to allow projection 27 to clear the ledge 16g of sleeve 16. If end face 16f of sleeve 16 is chamfered, a ramp is provided projection 27. Such a ramp can effect the deflection of key 20. However, if a sleeve, not shown, does not have such a lead-in, the deflection is readily effected manually. When liners 18 and 19 and key 20 are positioned in sleeve 16, the resilience of the material of key 20 causes the key to straighten to its normal condition and projection 27 is thereby inserted and retained in slot 16d. Further, of course, shaft 13 upon assembly in liners 18 and 19 then and thereafter secures projection 27 in slot 16d. That is, key 20 also cannot be removed except after removal of shaft 13.

In considering the nondestructive removal of key 20, it is assumed that no ambient material has accumulated in recess 20c. If recess 20c is adequately clear, and liners 18 and 19 are not tight in bore 16b, removal of key 20 and liners 18 and 19 is readily effected by lifting projection 27 out of slot 16d and pulling the key 20 from slot 16c and liners 18 and 19 from bore 16b. Any of several common tools may be employed, e.g. pliers (not shown) may be used to grasp section 21 of key 20 and to pull the key. As shown, the end of the screwdriver 40 may be inserted in slot 20s and pivoted against the end of sleeve 16 to bend and unlock key 20 and then effect its removal. Normally, if key 20 may be removed as described, it may also be reused. However, the destructive removal of key 20 may be more convenient. The pending application for patent above referred to describes as a normal and desireable possibility the incrustation of liners 18 and 19 by accumulating rust. Even though the drive line is regularly enclosed for personnel safety, the conditions of use in agricultural machinery makes such incrustation a normal expectation applicable equally to the nylon key 20. Accordingly and according to the present invention, the normal complement of replacement liners 18 and 19 would include, as well, a replacement key 20. Thus, the nominal cost of key 20 and its replacement is of especial significance.

The destructive removal of key 20 and that of liners 18 and 19 which are worn-out inside and tightly encrusted in bore 16 is not shown in the drawings. After removal of shaft 13, screwdriver 40 can be inserted in the groove 16c opposite that in which key 20 is fixed and the liners may be pried and broken loose from bore 16b. The removal of key 20 may be effected in a similar manner. That is, section 21 may be broken from section 22 or sections 21 and 22 may be freed in groove 16c sufficiently to be wedged between key 20 and the bottom of the groove and then pried loose.

ALTERNATE EMBODIMENTS OF THE INVENTION

Liners 18 and 19 may be combined to comprise a single liner, not shown, and key 20 would then not include the projecting section 23.

It is preferred that the key 20 be formed of a resilient material. However, the key could be merely flexible. In that case, the key would be removable in the same manner as described, but to secure the key in groove 16c, the outer end would have to be depressed radially outwardly in order to cause projection 27 to become engaged in recess 16d.

The following CLAIMS particularly point out and distinctly claim the subject matter which the applicants (inventors) regard as their invention and are intended to include all alternate embodiments of the invention which are and are not presently contemplated by the inventors but are within the scope of the following CLAIMS.

We claim:

1. In a telescoping drive shaft assembly comprising an outer member having an open end and an axial bore, an inner member, and a liner fitting within the bore of said outer member and having an axial bore in which said inner member fits and is axially slidable, said liner including an outer body and a relatively low friction inner face such that only nominal axial securement of the liner in the outer member is required, retainer means providing such axial securement which includes (1) a keyway provided in the outer member adjacent to one of said unloaded sections of the liner, (2) a radially outward recess provided in the outer member at the open end of said keyway, and (3) a flexible key slidable endwise in said keyway and disposed alongside the liner, said key having inner and outer locking ends which project into the bore of the outer member at the opposite ends of the liner, the outer locking end having a radially outward projection which extends into said recess, the portion of the key adjacent to said outer locking end being of reduced section and spaced from the liner whereby the outer locking end of the key may be moved inwardly to withdraw the projection from the recess and allow the key together with the liner to be withdrawn axially from the outer member.

2. The assembly of claim 1 which includes several axially spaced liners and the key includes a central portion which extends into the bore of the outer member and intermediate said liners to space the same.

3. The assembly of claim 1 wherein the locking end of the key which includes said projection extends up to the inner member such that the withdrawal of the inner member from the outer member is required to allow key to be released from the keyway.

4. The assembly of claim 1 wherein the key is of a resilient material.

5. In a telescopic drive line having an outer sleeve, an inner shaft and an intermediate liner, the cross-sections thereof being noncircular for the transmission of a rotational force, the inner shaft being axially slideable in the liner; means for securing the liner endwise in the outer sleeve comprising a key fitting in a groove formed in said outer sleeve and having radially inward portions engaging the opposite ends of the liner and a radially outward projection fitting a recess in the sleeve, said key being of a flexible material and dimensioned whereby the key may be bent to allow its engagement and disengagement from said recess and the insertion and withdrawal of said liner.

6. In the telescopic drive line of claim 5, one of said inward portions being proximate said outward projection such that the inner shaft prevents bending of the key and must be removed from the liner to permit its removal.

7. In a telescoping drive shaft assembly comprising an outer member having an open end and an axial bore, an inner member, and a liner fitting within the bore of said outer member and having an axial bore in which said inner member fits and is axially slidable, said liner including an outer body and a relatively low friction inner face which defines the inner bore of the liner such that only nominal axial securement of the liner in the outer member is required, the transverse dimensions of the inner member and of the bores of the liner and outer member being such that spaced parallel axially extending sections of the liner are compressively loaded and intermediate sections of the liner are relatively unloaded in the operation of the drive shaft; retainer means providing such axial securement which includes (1) a keyway provided in the outer member adjacent to one of said unloaded sections of the liner, (2) a radially outward recess provided in the outer member at the open end of said keyway, and (3) a key slidable endwise in said keyway and disposed alongside the liner, said retainer having inner and outer locking ends which project into the bore of the outer member at the opposite ends of the liner, the outer locking end having a radially outward projection which extends into said recess, the portion of the key adjacent to said outer locking end being of reduced section and spaced from the liner and being of a resilient material whereby the outer locking end of the key may be moved inwardly to withdraw the projection from the recess and allow the key together with the liner to be withdrawn axially from the outer member.

8. The assembly of claim 7 which includes several axially spaced liners and the key includes a central portion which extends into the bore of the outer member and intermediate said liners to space the same.

* * * * *